United States Patent [19]

Richardson et al.

[11] Patent Number: 4,721,654

[45] Date of Patent: * Jan. 26, 1988

[54] HOLLOW, MOLECULARLY ORIENTED COPOLYAMIDE ARTICLE

[75] Inventors: John C. Richardson, St. Louis, Mo.; Morris Salame, Windsor, Conn.

[73] Assignee: Monsanto Company, St. Louis, Mo.

[*] Notice: The portion of the term of this patent subsequent to Sep. 29, 2004 has been disclaimed.

[21] Appl. No.: 602,319

[22] Filed: Apr. 20, 1984

[51] Int. Cl.$^4$ .................... B32B 27/08; C08G 69/08
[52] U.S. Cl. .................... 428/474.4; 428/35; 528/310
[58] Field of Search ............ 528/310; 428/35, 474.4

[56] References Cited

U.S. PATENT DOCUMENTS

| | | | |
|---|---|---|---|
| 3,549,601 | 12/1970 | Fowell | 260/78 |
| 3,597,400 | 8/1971 | Kashiro et al. | 260/78 R |
| 4,022,756 | 5/1977 | Chapman et al. | 260/78 R |
| 4,255,560 | 3/1981 | Meyer et al. | 528/339 |
| 4,261,473 | 4/1981 | Yamada et al. | 215/1 C |
| 4,288,478 | 9/1981 | Kinoshita et al. | 428/35 |

FOREIGN PATENT DOCUMENTS

| | | |
|---|---|---|
| 52-50 | 1/1978 | Japan . |
| 6355 | 1/1978 | Japan . |

*Primary Examiner*—John E. Kittle
*Assistant Examiner*—Patrick J. Ryan
*Attorney, Agent, or Firm*—Lawrence L. Limpus

[57] ABSTRACT

A new article of manufacture in the form of a hollow, biaxially oriented, article such as a container, formed of a composition comprising a copolyamide of hexamethylene terephthalamide and hexamethylene isophthalamide, the ratio of terephthalic acid to isophthalic acid used in forming the copolyamide being between about 1.0 to about 1.9. The article is preferably heat set and optically clear where oriented and can be functionally in hot fill and autoclave food packaging applications.

5 Claims, No Drawings

HOLLOW, MOLECULARLY ORIENTED COPOLYAMIDE ARTICLE

CROSS-REFERENCE TO RELATED APPLICATION

"Hollow Copolyamide Article", J. C. Richardson et al, Ser. No. 602,318, , filed Apr. 20, 1984, now U.S. Pat. No. 4,696,865 on Sept. 29, 1987.

BACKGROUND OF THE INVENTION

This invention relates to copolyamides of hexamethylene terephthalamide (6TA) and hexamethylene isophthalamide (6IA) and more particularly to hollow, biaxially oriented, optically clear articles formed of such copolyamides.

Containers formed of thermoplastic barrier polymers for packaging environmentally sensitive food and highly permeable non-food products are known. Barrier polymers are materials possessing significant resistance to permeation of one or more fluids such as oxygen, and carbon dioxide gas, water vapor, hydrocarbons and organic solvents and the like. Products which have been packaged, or are potentially packagable, in articles formed of barrier polymers include carbonated soft drinks, beer, salad oils, nuts, jams, coffee, medicines, household chemicals, agricultural fluids, cleaning solvents, industrial adhesives, and the like. Particularly demanding food packaging applications are those required to accommodate hot fill (90°–100° C.) and autoclave (125° C.) temperatures for sterilization, such as encountered with baby foods, canned goods and the like. Barrier polymers molded into containers such as bottles, cans and like shapes which have been used in these applications include acrylonitrile copolymers containing more than 50 weight percent acrylonitrile, biaxially oriented chemically modified and unmodified polyethylene terephthalate and high density polyethylene surface treated with fluorine. Laminates of plural layers with a barrier polymer such as vinylidene chloride or ethylene vinyl alcohol as one layer have also been used.

In spite of progress to date, there remains a desire in the marketplace for cost-effective barrier polymer packages having an improved balance of properties including optical clarity, strength, solvent and gas barrier resistance and, in the case of foods, the capability to withstand high temperatures.

Japanese (laid-open) patent application No. 79472/76 of Toray Industries, Inc. recognizes copolyamides of hexamethylene terephthalamide (hereinafter referrerd to as "6TA") (20–65 weight %) and hexamethylene isophthalamide (hereinafter referred to as "6IA") (35–55 weight %), optionally including epsilon caprolactam, in the form of biaxially stretched packaging film having superior oxygen, water vapor, etc. gas barrier properties and resistance to boiling water and high retort temperatures. This publication, however, teaches such copolyamides only as thin, wrapping films having a thickness of about 0.7–0.8 mils (0.017–0.020 mm) initially formed by depositing and solidifying the melt on a casting drum.

U S. Pat. No. 4,022,756 discloses such copolyamides as molecularly oriented fibers.

SUMMARY OF THE INVENTION

Now, however, improvements have been made in copolyamide resins of 6TA and 6IA which facilitate formation therefrom of packaging materials other than film.

Accordingly, it is a principal object of this invention to provide a plastic packaging innovation in the form of a new article of manufacture formed from such copolyamides of 6TA and 6IA.

Another object is to provide such an article of manufacture in the form of a hollow, shaped, biaxially oriented, article, such as a container in the form of a relatively thick-walled bottle possessing excellent barrier properties which are better than those of most other barrier polymers which have been commercialized insofar as resisting the permeation of fluids (either into or out of the article) adversely affecting the quality of products packaged therein.

An additional object is to tailor such copolyamides from those disclosed in the prior packaging art to overcome processing difficulties encountered in forming relatively thick-walled articles and render them suitable for blow molding.

These and other objects are accomplished in the present invention by providing a new article of manufacture comprising a hollow, biaxially oriented, article which is preferably optically clear and is formed of a composition comprising a copolyamide of hexamethylene terephthalamide and hexamethylene isophthalamide, the weight ratio of terephthalaic acid to isophthalic acid used in forming the copolyamide being between about 1.0 to about 1.9 and preferably between 1 to 1.5. The article has walls which are preferably heat set to provide a crystallinity level in the copolyamide of at least about 50%.

The copolyamide articles of the invention typically have: oxygen permeability no greater than 0.9 and preferably no greater than $$0.6 \frac{(cc) \, (mil)}{(100 \text{ sq. in.}) \, (day) \, (atm)},$$

relative humidity; water permeability no greater than $$3.5 \frac{(gm) \, (mil)}{(100 \text{ sq. in.}) \, (day)}$$

bon permeability, using heptane as the hydrocarbon, no greater than $$0.2 \frac{(gm) \, (mil)}{(100 \text{ sq. in.}) \, (day)},$$

measured at

From the standpoint of copolyamide preparation, a special polymerization process is preferably employed to provide a material having a high molecular weight and relatively broad molecular weight distribution. Such polymerization process utilizes a capping agent to promote branching between copolyamide polymer chains during polymerization and optionally may include a finishing step to increase the molecular weight of the initially polymerized material.

DETAILED DESCRIPTION OF PREFERRED EMBODIMENTS

The hollow, molecularly oriented articles of this invention are made from a random copolyamide prepared from hexamethylene diamine, terephthalic acid and isophthalic acid. Such copolyamide consists essentially of chemically combined, recurring units of hexamethylene terephthalamide and hexamethylene isophthalamide. The formula for each such unit is disclosed in U S. Pat. No. 4,022,756, col. 2, lines 50 to 60, the content of which is incorporated herein by reference In order to provide the barrier properties required for the broad range of packaging applications contemplated by the articles of this invention, the ratio of terephthalic acid to isophthalic acid used in forming the copolyamide must be between about 1.0 to about 1.9 and preferably between 1 to 1.5. These ratios are obtained when the weight ratio of 6TA units to 6IA units in the copolyamide copolymer is from 50:50 to 65:35. The preferred composition is 56:44 6TA/6IA.

The 6TA/6IA polymers of the hollow, molecularly oriented articles of this invention are prepared by melt polymerizing an aqueous solution containing the appropriate amounts of a mixture of 6TA salt and 6IA salt under conditions of controlled time, temperature and pressure. Preferably, polymerization is conducted in three cycles. During the first cycle the reaction mixture is heated from room temperature to about 140° $\propto$ 242° C. while under a pressure of 140–350 psig (964.6–2411.5 kPA). During the second cycle the reaction mixture is heated to about 300° C. while holding the pressure substantially constant at about 350 psig (2411.5 kPA). During the third cycle the temperature is allowed to increase slightly, for example, an additional 10° to 20° C., while the pressure is reduced to atmospheric. After completion of the third cycle the resulting molten mass may be optionally held at atmospheric pressure at or above its melting temperature for a period of time sufficient to bring it to equilibrium, for example, 30 minutes. The optimum time, temperature and pressure involved in conducting the polymerization cycles will vary somewhat depending on the melting point of the particular 6TA/6IA copolymer being prepared.

The polymerization process for preparing the copolyamides of the molecularly oriented, hollow articles of this invention departs from the prior art in the polymerization recipe used in forming such copolymers. A capping agent is included in the polymerization charge to chemically limit the molecular weight of the copolyamide being formed and facilitate its subsequent melt processing into precursors (to be further described) which can be stretch-blow molded into the molecularly oriented hollow articles. Suitable usable capping agents include monofunctional hydroxides which are thermally stable and remain liquid during polymerization formation of the copolyamides. Such hydroxides comprise metal hydroxides, e.g. those wherein the metal is a member of Group 1A of the Periodic Table (i.e. sodium, potassium, lithium, etc.), phenol, naphthol and the like. Sodium hydroxide is preferred.

The concentration of the capping agent used should be adequate to provide between 10 to 100 equivalents per million grams of polymer.

An optional step in synthesizing the copolyamides of the articles of this invention involves further polymerizing the capped polymer referenced above while such polymer is in the solid state until its viscosity is just below the level where it becomes impossible to pump during melt processing. The preferred level is that wherein the polymer has an inherent viscosity of about 1.5 grams per deciliter measured according to a procedure further described hereinafter. This final polymerization step serves to break polymer chains within the already capped ends and permit the several pieces to randomly join with other broken chains thereby increasing molecular weight and broadening molecular weight distribution. This optional step of polymerizing the already formed solid copolyamide is accomplished by holding the polymer at elevated temperature on the order of about 240° C. while under negative pressure, preferably full vacuum, and exposed to an inert gas sparge. Temperatures above such 240° C. tend to degrade the copolyamide polymer at the 6TA/6IA ratios required for optimum barrier packaging.

In addition to the capping agent for molecular weight control, the copolyamides which are the subject of this invention may contain other additives in minor proportions, e.g. heat and light stabilizers, cross-linking agents, toughening agents such as rubber for increasing strength and the like.

The hollow, molecularly oriented, articles of this invention for packaging environmentally sensitive food and highly permeable, non-food products may be provided in a variety of sizes and shapes, that chosen frequently being determined by the nature of the product being packaged and the use contemplated for the package. Such articles comprise relatively large and small one-trip and reusable shipping and storage containers such as bottles, tubs, wide and narrow mouth jars, cups, drums, cans and like shapes. The preferred configuration is a bottle having upstanding walls tapering to an opening provided with a spiral thread for engaging a cooperating surface of a closure for sealing the open end after filling. Containers of single, unlayered walls are preferred, although layered and coated structures are also within the scope of this invention provided that one thickness is formed of the copolyamide previously described. The sidewall thickness of the hollow, molecularly oriented copolyamide article must be adequate to provide the barrier to permeability desired and, when present as a single, non-laminated structure, must also be adequate to withstand the abuse imposed by filling procedures and throughout distribution to the customer. A sidewall thickness of at least 3 mils (0.076 mm) is required for barrier and at least about 10 mils (0.254 mm), preferably 14 to 20 mils (0.36 to 0.50 mm) is usually adequate for one-trip, unlaminated structures.

For aesthetic purposes, all molecularly oriented portions of the articles of the invention are preferably optically clear although it is within the scope of the invention to include coloring pigment(s) in the copolyamide formulation to provide an opaque article when desired for a particular packaging application.

The hollow articles of this invention must be molecularly oriented in two directions, i.e. lengthwise and breadthwise, in order to provide the increased crystallinity and therefore improved barrier properties. Molecular orientation is developed by stretching the copolyamide in two directions while the plastic is within its molecular orientation temperature during formation of the hollow article. The molecular orientation temperature range of the particular class of copolyamides involved in this invention is above the glass transition temperature (Tg) but below the crystallization temperature (Tc). This range for the copolyamides of the invention is from 20° C. above Tg to 20° C. below Tc. The preferred range is 135° to 165° C.

The hollow articles of this invention can be shaped by any of the known fabricating techniques employing a copolyamide preform at molecular orientation temperature. For example, the 6TA/6IA copolyamide may be melted and formed in a conventional screw-injection molding assembly into the shape of a tubular preform having one open end and one closed end which is cooled to room temperature to set the plastic. This preform is then increased in temperature to within the molecular orientation temperature range by conditioning in a heating oven. This preform, which is capable of retaining its shape at the temperature involved, is then suspended in the cavity of a blow mold where a stretch rod is inserted therein against the closed end to uniaxially stretch the preform against the closed end of the mold cavity and then air under pressure is admitted immediately thereafter to readily expand the axially stretched preform outwardly against the cavity walls to form the hollow, molded, biaxially molecularly oriented, article. Alternatively, the copolyamide may be shaped into other preform configurations, such as sheet, open end tubes and the like prior to temperature conditioning and biaxial stretch-molding.

To improve the barrier properties inherently provided by the polymeric structure of the copolyamide even further from those present after conventional stretch-blow molding, the crystallinity level of the copolyamide can be increased to a level of at least about 50% and preferably between about 50 to about 70% by heat setting the shaped article. This may be accomplished by exposing the article to an elevated temperature of between about 120° to about 200° C. for a time sufficient to increase the crystallinity level for the particular 6TA/6IA copolyamide involved to the desired amount.

However, as an important facet of this invention, in order to preserve optical clarity in the shaped, hollow, molecularly oriented articles during heat setting, it has been found necessary to preserve the previously established molecular orientation during heat setting or else the molecularly oriented plastic of the article will turn opaque. More specifically, if the articles are heat set in a relaxed state in an oven at the heat set temperature the plastic will shrink and opacity will develop whereas if heat setting occurs while the walls of the article are stressed to a level at least as great as developed during stretching for orientation, clarity will be preserved while crystallinity is being increased. The preferred method for accomplishing this is to have the walls of the mold cavity within which the preform is stretch-blow molded at the elevated heat set temperature desired and then hold the expanded plastic against such walls under pressure of the blowing air for the appropriate heat set period.

The following procedures were used in obtaining the values for the various properties presented in the Examples following: Oxygen permeability:

$$\frac{(cc)\,(mil)}{(100\text{ sq. in.})\,(day)\,(atm)} \text{ at } 23°\text{ C.,}$$

50% relative humidity. An Ox-Tran 100 oxygen permeability cell available from Mocon Co., Minneapolis, Minn. was used.

Water permeability-direct liquid contact.

$$\frac{(gm)\,(mil)}{(100\text{ sq. in.})\,(day)} \text{ at } 38°\text{ C.}$$

A Mocon water permeability cell was used.
Hydrocarbon permeability-direct contact with heptane.

$$\frac{(gm)\,(mil)}{(100\text{ sq. in.})\,(day)} \text{ at } 23°\text{ C.}$$

Blow molded bottles were used to make this measurement.
Melt viscosity-capillary rheometer by Instron.
Crystallinity-by X-ray diffraction.
Inherent viscosity: A solution of 0.125 gr. of polymer in 25 ml of a 40/60 weight percent solution of symmetrical tetrachloroethane and phenol was prepared and filtered. The drop time for the solution with (T) and without (To) dissolved polymer to pass through an orifice was noted and the inherent viscosity in grams per deciliter calculated from the equation:

$$n° = \frac{\ln\frac{T}{To}}{c}$$

where c is the concentration in grams per 100 ml. of solvent.

The invention is further described with reference to the following Examples which are for illustration only and are not intended to imply any limitation or restriction on the invention. Unless otherwise indicated, all quantitites and percentages are expressed by weight.

EXAMPLE 1

This Example illustrates the preparation in water of a 56/44 salt of 6TA/6IA which is the material from which the copolyamide of hexamethylene terphthalamide/isophthalamide is polymerized.

565 pounds (256.5 Kg) of an 85% solution of hexamethylene diamine in water were pumped to a stirred tank containing 460 gallons (1743 l) of water at about 20° C. 326 pounds (148 kg) of terephthalic acid (100% polymer grade) and 256 pounds (116 kg) of isophthalic acid (100% polymer grade) were then charged and the contents stirred for about one hour without external heat followed by water flushing of the walls above the liquid level to avoid any residual acid remaining thereon. The pH was adjusted to 7.30±0.01 with an acid mixture of 56/44 TA/IA or diamine. The dilute salt solution (about 20%) was then increased in salt concentration by removing water through evaporation in an agitated vessel equipped with a coil connected to 40 psig (275.8 kPA) steam. 85 gallons (322 l)of the dilute salt solution were initially charged and then as evaporation proceeded 95 more gallons (360 l) were charged. Also charged were additives intended to function in the subsequent polymerization step—i.e. 100 grams of a silicone antifoam agent available from Union Carbide as SAG 530, 79 grams of a 5% solution in water of manganese hypophosphite (to improve polymer UV light stability), 454 grams of a 10% solution in water of benzene phosphonic acid (to promote light crosslinking of the polymer) and 1108 grams of a 25% solution in water of sodium hydroxide capping agent. After about thirty minutes, the salt concentration was about 75%.

EXAMPLE 2

This Example illustrates the preparation of a copolyamide of 6TA/6IA having a weight ratio of 6TA to 6IA of 56:44, i.e. 6TA/6IA (56/44).

The contents of the evaporator (286 pounds (128 kg) of salt—100% basis) was charged to a stainless steel high pressure jacketed autoclave provided with a Dowtherm jacket heating system. The autoclave ingredients were slowly heated to a temperature of 260°–270° C. at which point the pressure was 350 psig (2414 kPa). At 242° C., steam began to boil off as the pressure increased to 350 psig (2414 kPA). The ingredients were continuously agitated by means of a wall-scraping blade contained within the autoclave. After approximately 80 minutes at 350 psig (2414 kPA), the pressure was gradually reduced to atmospheric over approximately 30 minutes while allowing the melt contents to rise and level out at about 325° C. The agitator was stopped and an inert gas blanket at 150–200 psig (1035–1379 kPA) was imposed on the 325° C. melt contents to force the molten polymer in web form out of the autoclave onto a casting wheel turning at about 53.5 ft./min. (0.27m/sec.), and having a surface temperature maintained at about 85° C. The solidified polymer was fed from the wheel to a commercial dicer for comminuting to pellet form. The intrinsic viscosity of the polymer was 0.864 grams per deciliter.

EXAMPLE 3

This Example illustrates preparation of a hollow, biaxially oriented, optically clear article of the invention formed of the copolyamide of Example 2.

The 6TA/6IA (56/44) polymer of Example 2 was dried under vacuum to no greater than 0.25% water, melted in a one inch (2.54 cm) heated injection molding unit and pumped while molten into an annular space in a cooled injection mold having a shape corresponding to a tubular preform generally conforming to the shape shown in FIG. 1 of U.S. Pat. No. 3,900,120, which is incorporated herein by reference. After cooling in the mold to set the copolyamide plastic, the ejected tubular preform had a shape corresponding to the mold cavity, i.e. a closed, hemispherical bottom at one end and a molded threaded wall surrounding the opposite open end.

The body of a molded tubular preform of 6TA/6IA (56/44) copolyamide below the threaded end were then reheated in an oven equipped with infrared heaters while rotating about its lengthwise axis until the walls of the preforms reached about 150° C., which is within the molecular orientation temperature range of the 56/44 polyamide. It was then immediately placed between partible sections of a blow mold having a cavity with a bottle-shaped periphery and, after mold closing, was reshaped by initially conventionally advancing a rod into the preform and forcing it against the inner surface of the closed end to stretch the preform axially until the closed end contacted the base of the mold cavity, followed immediately by expansion outwardly with pressurized air against the peripheral surface of such mold cavity. The cavity wall was cooled in conventional manner and, after setting the copolyamide through contact with such cavity wall for a brief period, the blow mold was opened to discharge each shaped bottle. Walls of the shaped bottles were visually optically clear to the human eye and, after testing were found to have the following permeability properties (units and measurement conditions as previously described):

Oxygen: 0.65
Water: 3.0
Heptane: 0.1

EXAMPLE 4

This Example is directed toward preparation of optically clear, molecularly oriented, heat set, copolyamide bottles, according to this invention.

The 6TA/6IA copolyamide of Example 2 was dried and fabricated into molecularly oriented, optically clear bottles using the procedure of Example 3. The bottles were placed in an oven for about five minutes at 200° C. for heat setting to promote crystallinity. It was observed, however, that in so doing the copolyamide turned opaque and the bottles shrunk about 50% making them non-funcional.

To test the effect on clarity of stressing the optically clear copolyamide of the bottles during heat setting, 2 inch×2 inch (5×5 cm) panel sections of optically clear copolyamide were cut from non-heat set bottles and placed under tension in a clamping device prior to placement in the oven for heat setting. Such device prevented shrinking from occurring during heating of the panels. After the heat set period, the sections were cooled to room temperature while remaining under tension and were visually observed to be optically clear in comparison with opaque samples obtained when the plastic was not held under tension during heat setting. Though not certain, it is believed that the biaxially oriented structure of the copolyamide prevents formation of spherulites which are responsible for causing the opaque color in the plastic and that when the oriented structure is exposed to heat set temperatures without being held under tension, the ordered molecular structure of the copolyamide achieved as a result of biaxial stretching at orientation temperature is lost and the plastic shrinks back and becomes opaque. It is therefore postulated that a facile procedure for increasing crystallinity without generating opacity in optically clear, molecularly oriented, tough, hollow articles is to operate the blow mold cavity walls against which the copolyamide is stretched at the heat set temperature and to hold the molecularly oriented copolyamide against such walls for the appropriate heat set period while under the positive pressure of about 100–200 (689–1378 kPA) psig of the blowing air. However, for applications where optical clarity is not needed or desired, coloring pigments can be incorporated into the copolyamide formulation to be molded.

The heat set, optically clear, molecularly oriented panel sections referred to above were measured for crystallinity and found to be about 50–70% crystalline in comparison with a level of 20% before heat setting, which represents an increase of at least about 150%. The barrier properties of the heat set panel sections and non-heat set bottles were measured and found to be as follows:

| Fluid | Heat Set | Non-Heat Set |
|---|---|---|
| $O_2$ | 0.15 | 0.65 |
| Water | 2.1 | 3.0 |
| Heptane | <0.1 | about 0.1 |

The foregoing data illustrates a significant decrease of 30 to 80% in the oxygen and water permeability values of heat set versus non-heat set optically clear, molecularly oriented hollow articles of the invention.

EXAMPLE 6

This Example illustrates the heat resistant properties of the non-heat set containers of Example 3.

After forming the bottles of Example 3 were immediately filled with water at 98° C. They were observed to neither shrink nor distort, which is an indication that such containers would be functional in hot fill food applications.

When the bottles of this Example were exposed to autoclave conditions (15 minutes at 125° C. using 15 psig (103.4 kPa) steam) they were observed to shrink excessively and turn opaque in color indicating they could not be used in an autoclave filling application.

EXAMPLE 7

This Example illustrates the capability of heat set, molecularly oriented bottles of the invention to withstand autoclave conditions.

To simulate what was done with the panel sections of Example 4, bottles from Example 3 were filled completely with lead shot and tightly sealed with screw caps. They were then heat set at the same conditions as for Example 5. After removal the bottles were emptied of the lead shot and exposed to the autoclave conditions of Example 6 and found to be optically clear where molecularly oriented, without any significant shrinkage occurring. These containers should therefore be quite functional under autoclave conditions.

While certain specific embodiments of the invention have been described with particularity herein, it will be recognized that various modifications thereof will occur to those skilled in the art. The scope of the invention, therefore, is to be limited solely by the scope of the following claims.

We claim:

1. A new article of manufacture comprising a hollow, biaxially oriented, article formed of a composition comprising a copolyamide of hexamethylene terephthalamide and hexamethylene isophthalamide, the ratio of terephthalic acid to isophthalic acid used in forming the copolyamide being between about 1.0 to about 1.9, the molecularly oriented walls of said article being heat set, optically clear and having an oxygen permeability no greater than $$0.6 \frac{(cc) \, (mil)}{(100 \text{ sq. in.}) \, (atm) \, (day)},$$

measured at 23° C., 50% relative humidity.

2. The article of claim 1 wherein said walls have been exposed to autoclave conditions of at least 15 minutes at 125° C. using 15 psig steam.

3. The article of claim 8 in the form of a container.

4. The article of claim 3 in the form of a bottle.

5. The article of claim 1, 2, 3 or 4 wherein said ratio is between 1 to 1.5.

* * * * *